US008439373B2

(12) United States Patent  (10) Patent No.: US 8,439,373 B2
Deegan et al.  (45) Date of Patent: May 14, 2013

(54) SYSTEMS AND METHODS FOR RAISING A SECTION OF A VEHICLE OFF THE GROUND WITHOUT A JACK

(75) Inventors: Michael Deegan, Arlington, VA (US); Paul Nephi Lowe, Riverside, CA (US)

(73) Assignee: The Boeing Company, Chicago, IL (US)

(*) Notice: Subject to any disclaimer, the term of this patent is extended or adjusted under 35 U.S.C. 154(b) by 1225 days.

(21) Appl. No.: 12/263,967

(22) Filed: Nov. 3, 2008

(65) Prior Publication Data

US 2010/0108966 A1 May 6, 2010

(51) Int. Cl.
*B60G 17/00* (2006.01)
(52) U.S. Cl.
USPC .................... 280/6.15; 280/6.153; 280/6.155
(58) Field of Classification Search ................. 280/6.15, 280/6.153, 6.155, 6.156
See application file for complete search history.

(56) References Cited

U.S. PATENT DOCUMENTS

| | | | |
|---|---|---|---|
| 3,836,014 A | 9/1974 | Johansson | |
| 3,982,636 A | 9/1976 | Furuto | |
| 4,086,982 A | 5/1978 | Hernick | |
| 5,702,222 A | 12/1997 | Rosen | |
| 5,915,700 A * | 6/1999 | Schneider et al. | 280/6.153 |
| 7,244,092 B1 | 7/2007 | Darst | |
| 2006/0182563 A1 | 8/2006 | De Jong et al. | |

* cited by examiner

*Primary Examiner* — Eric Culbreth
(74) *Attorney, Agent, or Firm* — Armstrong Teasdale, LLP (57) ABSTRACT

Described herein is a hydraulic suspension system mounted on a vehicle, including a plurality of hydraulic suspension units having a section of the vehicle corresponding thereto, and a hydraulic power device in communication with the plurality of hydraulic suspension units for providing a hydraulic fluid under pressure to actuate the plurality of hydraulic suspension units. The hydraulic suspension system mounted on a vehicle further includes a plurality of hydraulic valve assemblies associated with each of the plurality of hydraulic suspension units, wherein the plurality of hydraulic valve assemblies are in fluid communication between the plurality of hydraulic suspension units and the hydraulic power device, and a control device for controlling each of the hydraulic valve assemblies associated with each of the plurality of hydraulic suspension units.

18 Claims, 7 Drawing Sheets

SYSTEMS AND METHODS FOR RAISING A SECTION OF A VEHICLE OFF THE GROUND WITHOUT A JACK

BACKGROUND

Presently, a removal of one or more tires from a vehicle can be facilitated by raising the vehicle with a jack. The most common use of such jacks is to elevate a corner of the vehicle for the removal and replacement of a flat tire. The operator would normally remove the jack from its storage position and attach the jack to the vehicle's frame. The operator would then manually crank the jack to free the flat tire from contact with the ground. Subsequently, the operator would remove the tire using tools such as a tire tool or spider wrench and replace the tire in the same manner. The operator would then release tension on the jack and allow the vehicle to return to its original position.

Occasionally, portable jacks may be lost or otherwise are not available when needed. In still other times, a vehicle may have a flat tire that lowers the vehicle to such a degree that a jack cannot be placed under the vehicle. Further, the vehicle may be on such rugged terrain that raising the vehicle with a jack is not advisable. Thus, not only is using a jack very time consuming, it is often times dangerous, and at other times not possible to use due to the surrounding conditions.

SUMMARY

Described herein are systems and methods that do not require a jack to raise a section of vehicle off of the ground.

In embodiments, described herein is a method for using a plurality of hydraulic suspension units mounted on a vehicle to raise a section of the vehicle. The method includes utilizing each of the plurality of hydraulic suspension units to move the vehicle from a first position to a second position, each of the plurality of hydraulic suspension units having a section of the vehicle corresponding thereto, locking one of the hydraulic suspension units, and operating each hydraulic suspension unit that is not locked to move the vehicle to a third position, wherein moving the vehicle to the third position moves the section of the vehicle corresponding to the locked hydraulic suspension unit to a point such that a ground engaging member associated with the section of the vehicle is not longer in contact with the ground.

In further embodiments, described herein is a hydraulic suspension system mounted on a vehicle. The system includes a hydraulic power means in communication with the plurality of hydraulic suspension units for providing a hydraulic fluid under pressure to actuate the plurality of hydraulic suspension units, a plurality of hydraulic valve assemblies associated with each of the plurality of hydraulic suspension units, wherein the plurality of hydraulic valve assemblies are in fluid communication between the plurality of hydraulic suspension units and the hydraulic power means, and a control means operable to control each of the hydraulic valve assemblies and the associated plurality of hydraulic suspension units to increase or decrease a distance between a corresponding section of the vehicle and a ground surface.

In still further embodiments, described herein is a hydraulic suspension system mounted on a vehicle. The system includes a plurality of hydraulic suspension units having a section of the vehicle corresponding thereto, a hydraulic power means in communication with the plurality of hydraulic suspension units for providing a hydraulic fluid under pressure to actuate the plurality of hydraulic suspension units; a plurality of hydraulic valve assemblies associated with each of the plurality of hydraulic suspension units, wherein the plurality of hydraulic valve assemblies are in fluid communication between the plurality of hydraulic suspension units and the hydraulic power means, and a control means operable to control each of the hydraulic valve assemblies and the associated plurality of hydraulic suspension units. The control means is operable to control each of the hydraulic valve assemblies and the associated plurality of hydraulic suspension units to move the vehicle from an operating position to a lowest position, level the vehicle before moving the vehicle to the lowest position, and move the vehicle to a predefined height, wherein moving the vehicle to the predefined height moves the section of the vehicle corresponding to the locked suspension unit off of the ground.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

As mentioned above, presently, the removal of one or more tires from a vehicle can be accomplished by raising the vehicle with a jack. However, jacks may be lost or otherwise not available for service. In still other times, a flat tire may lower the vehicle to such a degree that a portable jack cannot be placed under the vehicle. Further, the vehicle may be on such rugged terrain that raising the vehicle with a jack is not advisable, due to safety issues. Thus, not only is using a jack very time consuming, it is often times dangerous and/or not even possible based on the surrounding conditions. Therefore, an ability to raise a section of the vehicle, for example, one wheel of the vehicle off the ground without the use of a jack makes it possible to change a tire much safer and quicker than existing solutions which require that a jack be placed in a specific position in order to raise a wheel of a vehicle.

Figure 1:
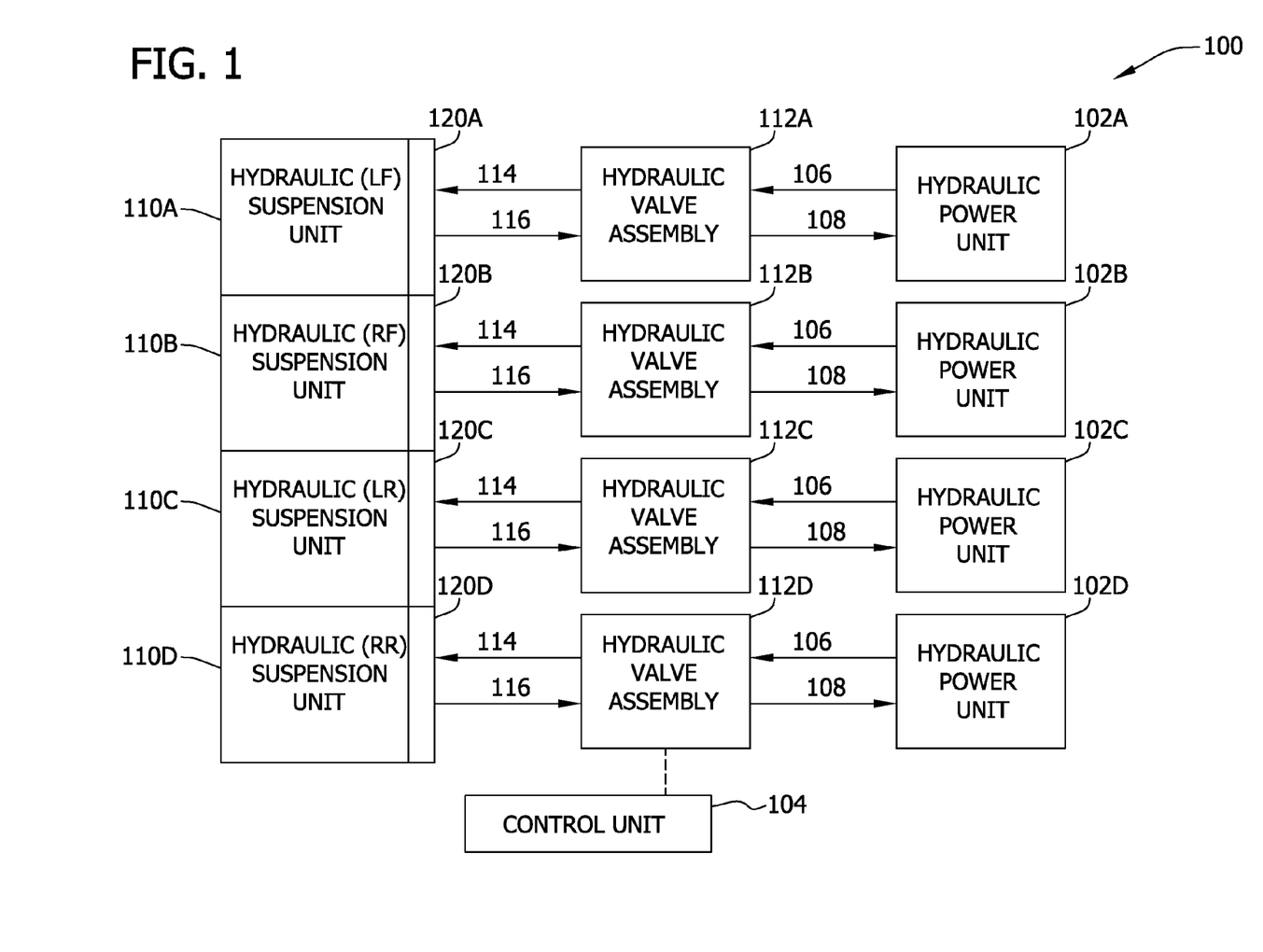
FIG. 1 is a block diagram of an exemplary hydraulic suspension system for use in implementing embodiments of the present disclosure.

Referring initially to FIG. 1, a block diagram of an exemplary hydraulic suspension system is shown and designated generally as hydraulic suspension system 100. In embodiments, hydraulic suspension system 100 includes a plurality of fluid (liquid or air) control systems including a plurality of hydraulic power units 102A-102D, and an operator control unit 104. The hydraulic power units 102A-102D provide hydraulic fluid under pressure through charge and return conduits 106 and 108 for eventual actuation of hydraulic suspension units 110A-110D. In embodiments, the hydraulic suspension system further includes four hydraulic valve assemblies 112A-112D for selectively locking and unlocking the hydraulic suspension units 110A-110D. That is, when one of the four hydraulic valve assemblies 112A-112D is closed, the corresponding hydraulic suspension unit is considered "locked" and is therefore unable to raise or lower.

In embodiments, the hydraulic valve assemblies 112A-112D are in fluid communication between the hydraulic suspension units 110A-110D by a charge line 114 and a return line 116 and the hydraulic power units 102A-102D by the charge and return conduits 106 and 108. In embodiments, operator control unit 104 is functionally connected to the valve assemblies 112A-112D to controllably select or operate one or more of the hydraulic suspension units 110A-110D.

Figure 3:
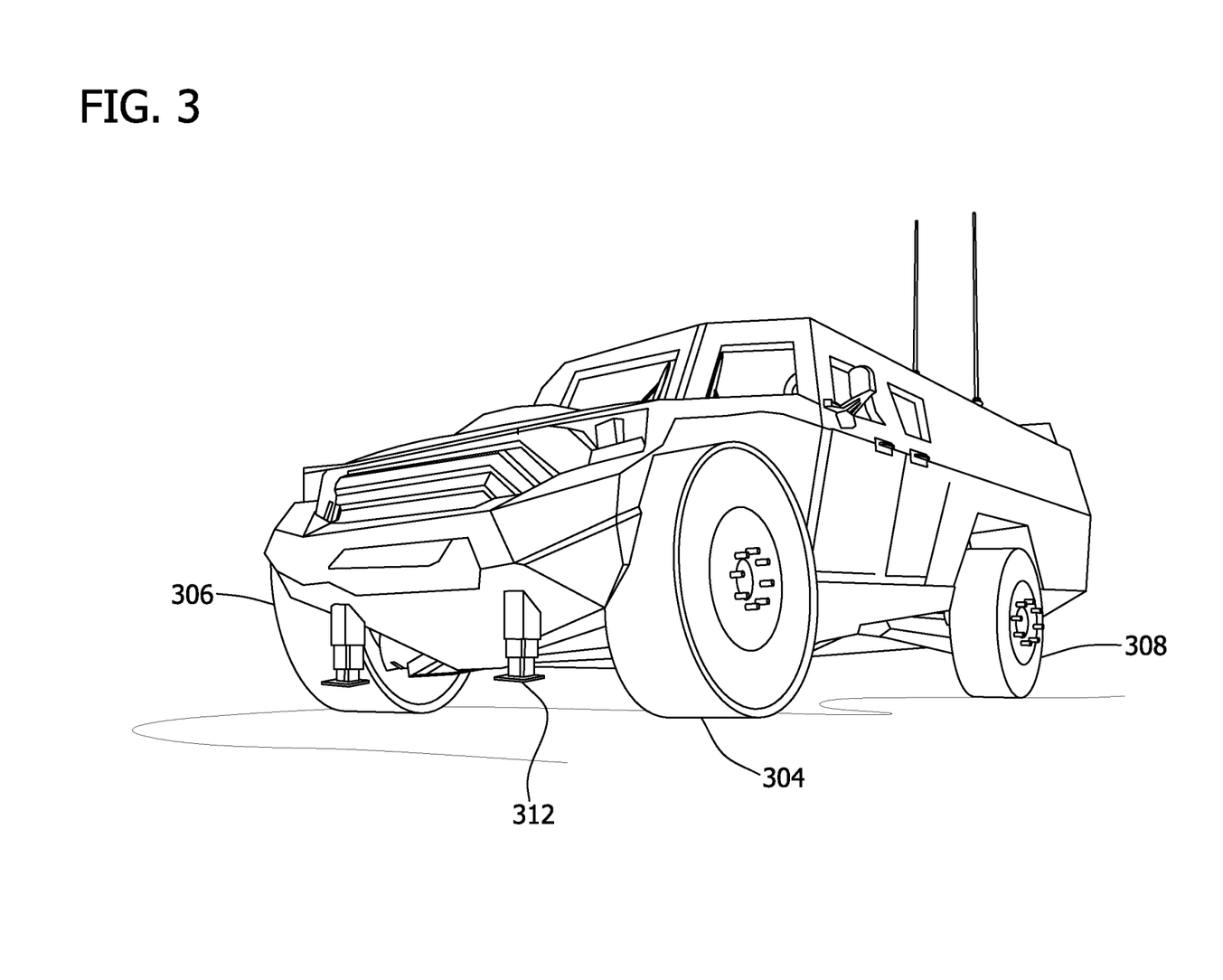
FIGS. 3-7 are an illustration of side views of a vehicle including a hydraulic suspension system for use in implementing embodiments of the present disclosure.

With a four-wheeled vehicle as depicted in FIG. 3, there is a left front wheel 304 that corresponds to the hydraulic suspension unit 110A, a right front wheel 306 that corresponds to the hydraulic suspension unit 110B, a left rear wheel 308 that corresponds to the hydraulic suspension unit 110C, and a right rear wheel (not shown) that corresponds to the hydraulic suspension unit 110D. Each wheel is assigned a corresponding select switch 120A-120D. The select switches 120A-120D selectively operate the hydraulic suspension units 110A-110D by closing or opening the hydraulic valve assemblies 112A-112D. In embodiments, as long as each of the hydraulic valve assemblies 112A-112D remain open, each of the hydraulic suspension units 110A-110D are considered "unlocked" and may be raised and lowered. In contrast, and as mentioned above, if any one of the hydraulic valve assemblies 112A-112D is closed, the corresponding hydraulic suspension unit 110A-110D is considered to be "locked" and may not be raised and lowered.

In embodiments, the control means 104 is operable to control each of the hydraulic valve assemblies 112A-112D and the hydraulic suspension units 110A-110D by lowering each of the hydraulic suspension units 110A-110D from a position where a vehicle may be operated, for example an original position, to a first, second, or low position, such as a lowest, position. In further embodiments, the control means 104 controls each of the hydraulic valve assemblies 112A-112D and the hydraulic suspension units 110A-110D by leveling the vehicle before lowering the vehicle to the lowest position.

In embodiments, the control means 104 is operable to control the hydraulic valve assemblies 112A-112D and therefore operate the hydraulic suspension units 110A-110D in order to move the vehicle a predefined height, wherein raising the vehicle to the predefined height raises a section of the vehicle corresponding to a locked suspension unit, for example, a section where a wheel is located and the tire mounted thereon, off of the ground, as will be described in more detail below with reference to FIGS. 2-7.

In embodiments, the hydraulic system 100 may further include a support bar 312, as shown in FIGS. 3-7, that is attached to the vehicle, wherein the support 312 bar is lowered to support a section of the vehicle where a wheel corresponding to the locked hydraulic suspension unit is located. In further embodiments, the support bar 312 extends at a same rate the vehicle is raised.

In embodiments, the control means 104 is operable to control the hydraulic valve assemblies 112A-112D and the hydraulic suspension units 110A-110D to lower the vehicle from the predefined height to an operating position. In embodiments, lowering the vehicle to the operating position lowers the wheel corresponding to the locked hydraulic suspension unit, and, for example a new tire mounted thereon, to the ground.

Figure 2:
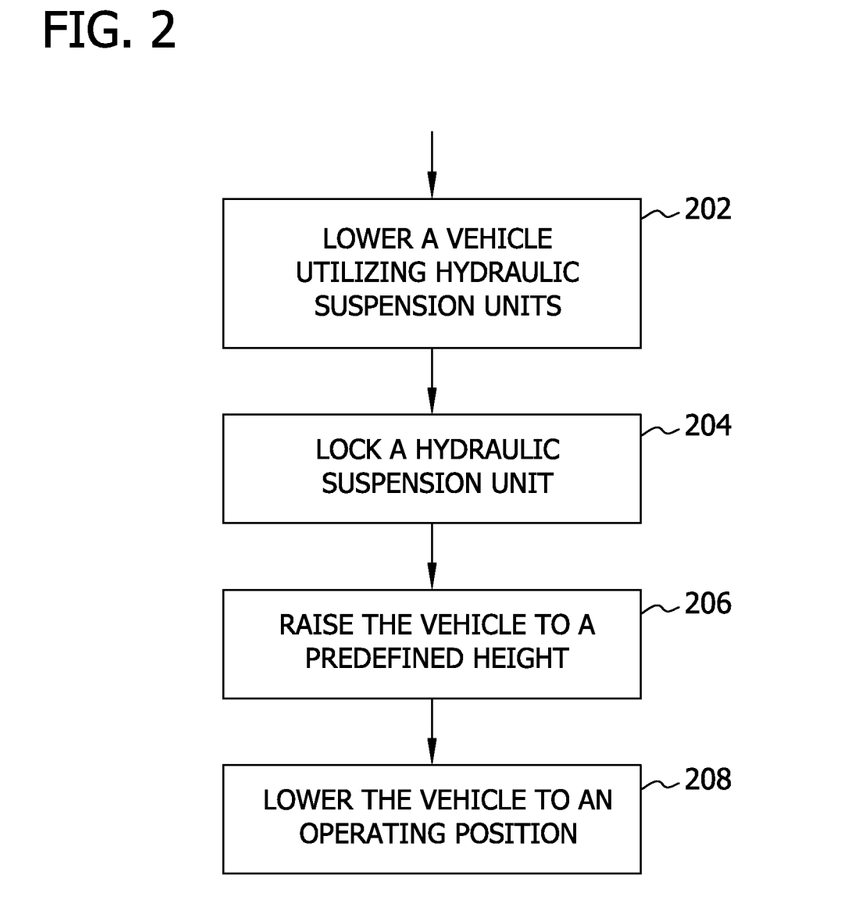
FIG. 2 is a flow diagram of an exemplary method for use in implementing embodiments of the present disclosure.
Figure 4:
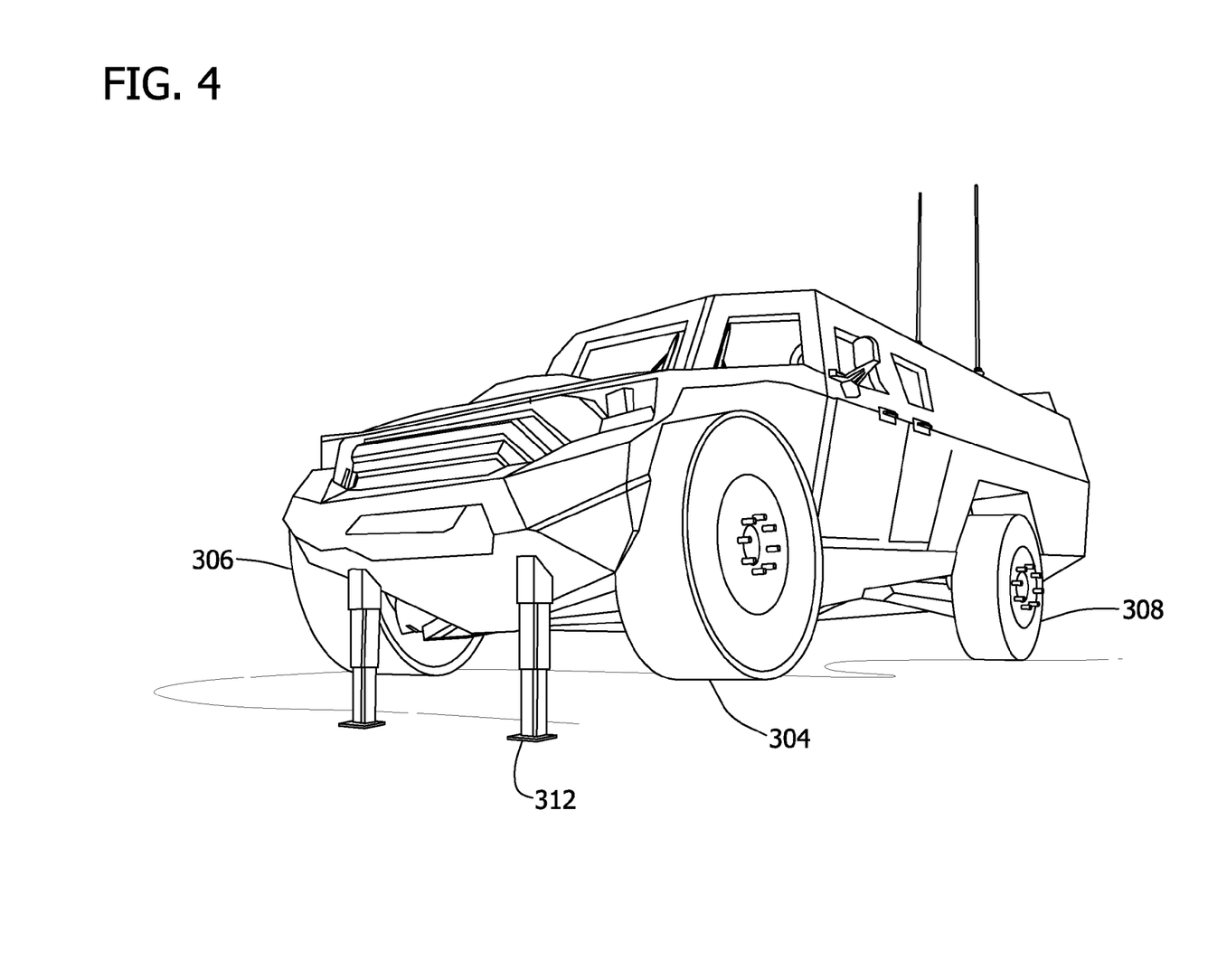

With reference now to FIG. 2, an exemplary method for use in implementing embodiments of the present disclosure will now be described. For example, once it is determined that a tire, for example, a tire on the left front wheel 304 illustrated in FIG. 3, on a vehicle needs to be changed and the vehicle is stopped, each of the hydraulic suspension units 110A-110D are utilized to lower 202 the vehicle from an operating position (see FIG. 3, illustrating a four wheeled vehicle being lowered) to a lowest position (see FIG, 4 illustrating a four wheeled vehicle at a lowest position), for example, a lowest position to which the vehicle is capable of being lowered. In embodiments, each of the hydraulic suspension units is utilized to level the vehicle before lowering the vehicle to the lowest position. Thus, when the vehicle is subsequently lowered, the vehicle being already level will maintain a proper balance through the process of being lowered and raised.

Figure 5:
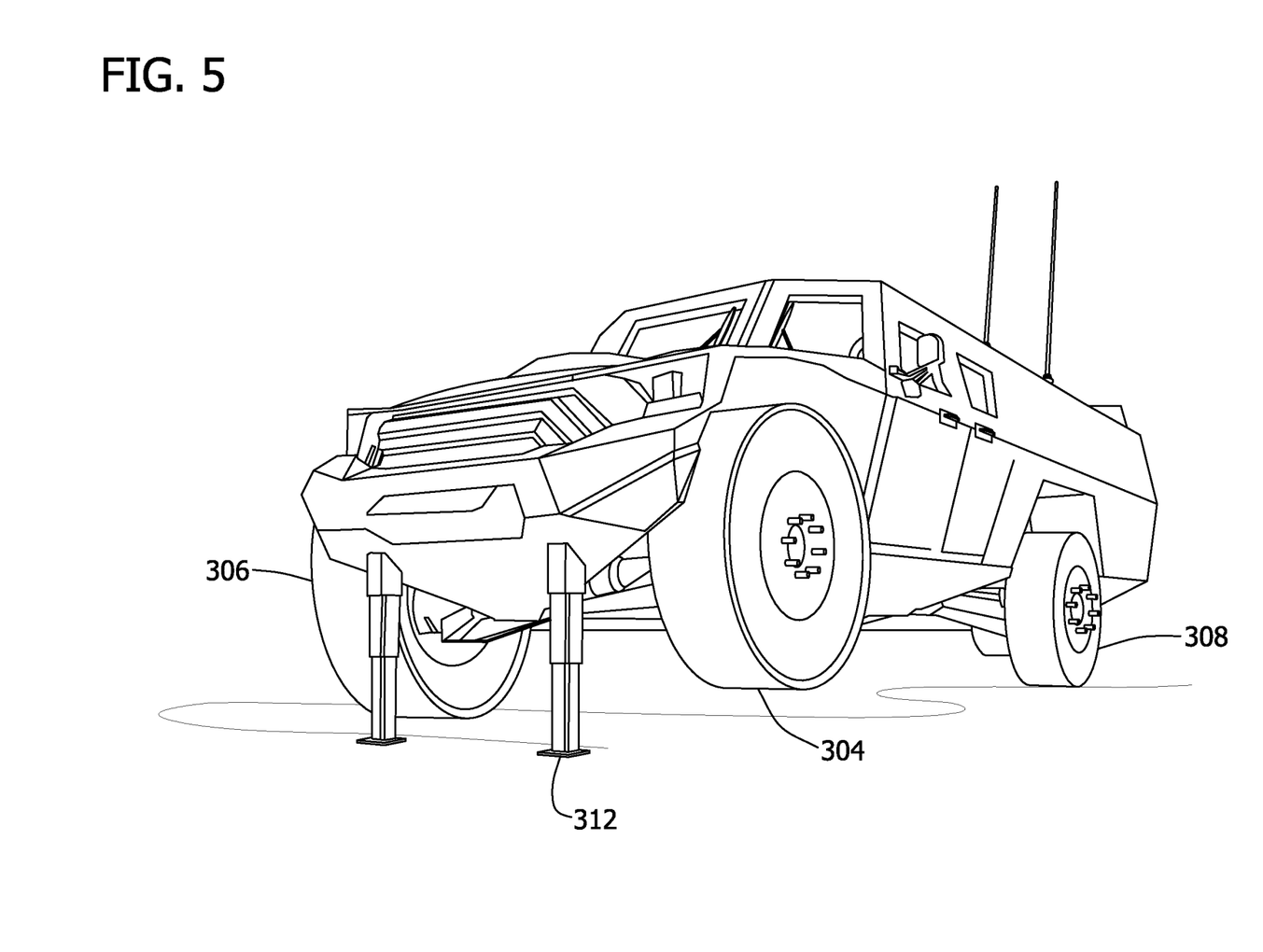

At the lowest position, a hydraulic suspension unit corresponding to a wheel of the vehicle in which the tire to be changed is mounted on is locked 204 (see FIG. 5 illustrating suspension unit corresponding to wheel 304 being locked after the four wheel vehicle is lowered). In embodiments, the support bar 312 attached to the vehicle may be lowered to support a section of the vehicle where the wheel of the locked hydraulic suspension unit is located. In further embodiments, a user electronically locks the hydraulic suspension unit corresponding to the wheel of the vehicle in which the tire to be changed is mounted via a user interface linked to the operation control unit 104 inside a cabin of the vehicle. In still further embodiments, the user interface is remote and/or is wirelessly linked to the operation control unit 104. Thus, a user does not have to be in the vehicle during the raising and lowering of the vehicle. In still further embodiments, a user manually locks the hydraulic suspension unit corresponding to the wheel of the vehicle in which the tire to be changed is mounted by physically closing an appropriate hydraulic valve assembly via an appropriate select switch 120A-120D.

Figure 6:
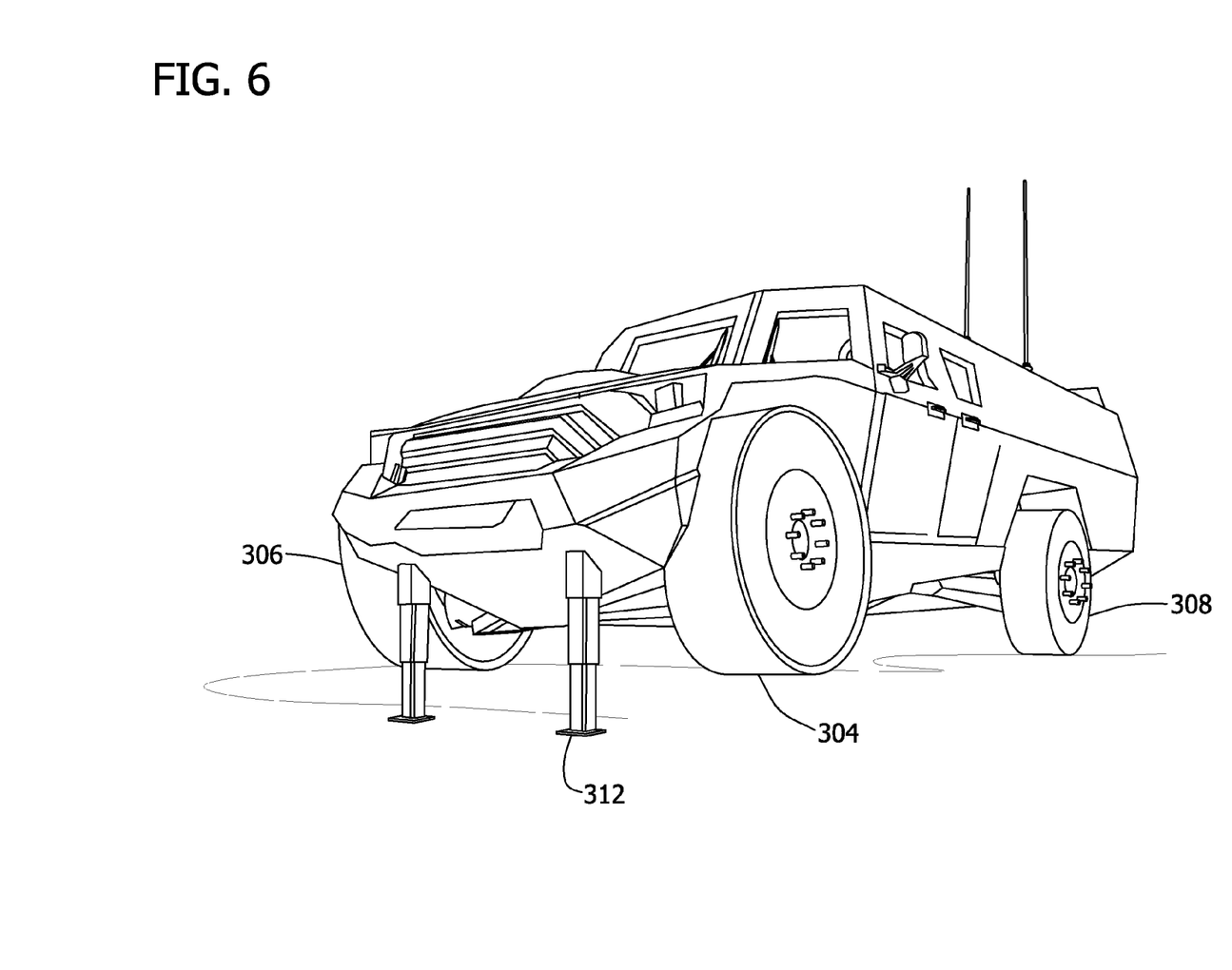

Once the hydraulic suspension unit corresponding to the wheel of the vehicle in which the tire to be changed is mounted on is locked, the vehicle is raised 206 by utilizing the other hydraulic suspension units that are not locked to raise the vehicle to a predefined height, for example a highest height to which the vehicle is capable of being raised. In embodiments, the support bar 312 extends at a same rate the vehicle is raised in order for the vehicle to maintain a proper support and balance. In further embodiments, the predefined height is a height high enough that the section of the vehicle, for example, the wheel corresponding to the locked suspension unit, and the tire mounted thereon, are off of the ground (see FIG. 6 illustrating a locked suspension unit corresponding to the wheel 304 being raised off of the ground by a height Δ), for example, a highest height the vehicle is capable of being raised. In embodiments, once the vehicle is raised to the predefined height, the tire mounted on the wheel corresponding to the locked hydraulic suspension unit may be replaced with a new tire.

Figure 7:
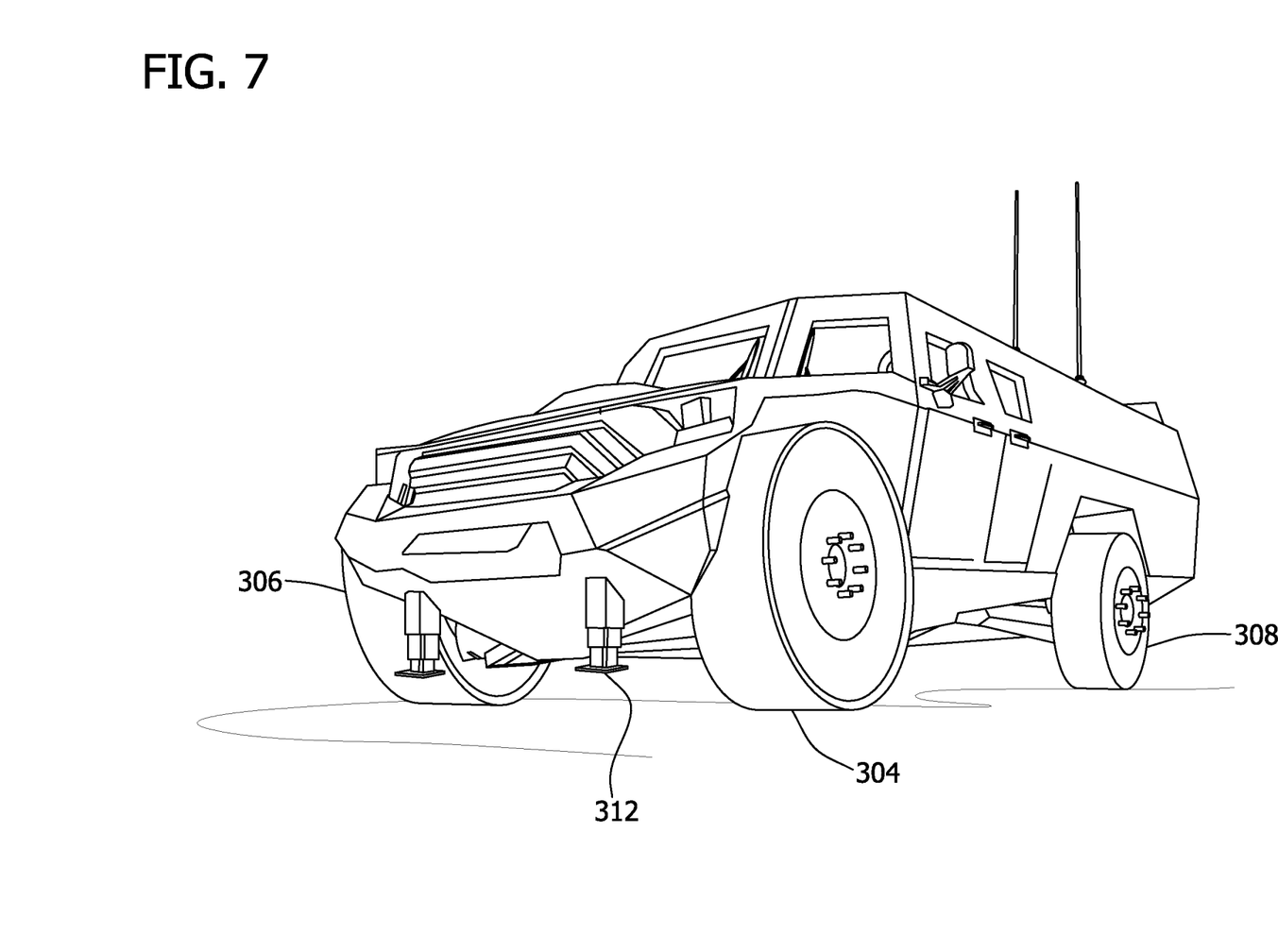

After the tire has been successfully replaced, the vehicle is lowered 210 to an operating position, for example the original position. In embodiments, lowering the vehicle to the operating position lowers the wheel corresponding to the locked hydraulic suspension unit, and the new tire mounted thereon, to the ground (see FIG. 7 illustrating wheel 302 being lowered to the ground). In further embodiments, if the support bar 312 described above is used, it is now retracted and/or removed from the vehicle as support is not needed once the vehicle is in an operating position and/or the original position.

One of ordinary skill in the art will appreciate that many different types of vehicles that have two or more wheels are within the scope of the present disclosure. Exemplary vehicles that may be used in accordance with the present disclosure are, but are not limited to: an airplane, a car, an ATV, a boxcar, a bulldozer, a bus, a truck, a helicopter, a crane, a locomotive, an eighteen wheeler, a limousine, a mobile home, a motor scooter, a motorcycle, an SUV, a subway car, a tractor, a tram, a van, and the like. Further, one of ordinary skill in the art will appreciate that objects, other than vehicles, that have two or more points of contact with the ground are also within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for using a plurality of hydraulic suspension units mounted on a vehicle to raise a section of the vehicle, the method comprising:
   utilizing each of the plurality of hydraulic suspension units to move the vehicle from a first position to a second position, each of the plurality of hydraulic suspension units having a section of the vehicle corresponding thereto;
   locking one of the hydraulic suspension units; and
   operating each hydraulic suspension unit that is not locked to raise the vehicle to a third position, wherein moving the vehicle to the third position moves the section of the vehicle corresponding to the locked hydraulic suspension unit to a point such that a ground engaging member associated with the section of the vehicle is no longer in contact with the ground.

2. The method according to claim 1, wherein the first position is an original position of the vehicle.

3. The method according to claim 1, wherein the second position is a low position of the vehicle.

4. The method according to claim 1, wherein the third position is a high position of the vehicle.

5. The method according to claim 1, further comprising utilizing each of the hydraulic suspension units that are not locked to lower the vehicle to a position wherein the vehicle is capable of being operated.

6. The method according to claim 1, further comprising utilizing a support bar to support the section of the vehicle corresponding to the locked hydraulic suspension unit.

7. The method according to claim 6, wherein the support bar extends at a same rate comparable to a rate at which the suspension units operate.

8. The method according to claim 1, wherein a user electronically locks the hydraulic suspension unit via a user interface inside a cabin of the vehicle.

9. The method according to claim 1, wherein a user manually locks the hydraulic suspension unit.

10. The method according to claim 1, further comprising utilizing each of the hydraulic suspension units to level the vehicle before moving the vehicle to the second position.

11. A hydraulic suspension system mounted on a vehicle, comprising:
   a plurality of hydraulic suspension units having a section of the vehicle corresponding thereto;
   a hydraulic power means in communication with the plurality of hydraulic suspension units for providing a hydraulic fluid under pressure to actuate the plurality of hydraulic suspension units;
   a plurality of hydraulic valve assemblies associated with each of the plurality of hydraulic suspension units, wherein the plurality of hydraulic valve assemblies are in fluid communication between the plurality of hydraulic suspension units and the hydraulic power means;
   a control means operable to control each of the hydraulic valve assemblies and the associated plurality of hydraulic suspension units to increase or decrease a distance between a corresponding section of the vehicle and a ground surface; and
   a support bar attached to the vehicle, wherein the support bar is moved to support a section of the vehicle to be moved off of the ground.

12. The system according to claim 11, wherein controlling each of the hydraulic valve assemblies and the associated plurality of hydraulic suspension unit includes moving the vehicle from an operating position to a lowest position utilizing each of the hydraulic suspension units.

13. The system according to claim 11, wherein controlling each of the hydraulic valve assemblies and the associated plurality of hydraulic suspension unit further includes utilizing each of the hydraulic suspension units to level the vehicle before moving the vehicle to the lowest position.

14. The system according to claim 13, wherein controlling each of the hydraulic valve assemblies and the associated plurality of hydraulic suspension unit further includes locking a hydraulic suspension unit.

15. The system according to claim 13, wherein controlling each of the hydraulic valve assemblies and the associated plurality of hydraulic suspension unit further includes utilizing each hydraulic suspension unit that is not locked to move the vehicle to a predefined height, wherein moving the vehicle to the predefined height moves the section of the vehicle corresponding to a locked suspension unit off of the ground.

16. The system according to claim 11, wherein the support bar extends at a same rate the vehicle is raised.

17. The system according to claim 15, wherein controlling each of the hydraulic valve assemblies associated with each of the plurality of hydraulic suspension unit further includes utilizing each of the hydraulic suspension units that are not locked to move the vehicle to the operating position, wherein moving the vehicle to the operating position moves the section of the vehicle corresponding to the locked hydraulic suspension unit to the ground.

18. A hydraulic suspension system mounted on a vehicle, comprising:
   a plurality of hydraulic suspension units having a section of the vehicle corresponding thereto;
   a hydraulic power means in communication with the plurality of hydraulic suspension units for providing a hydraulic fluid under pressure to actuate the plurality of hydraulic suspension units;
   a plurality of hydraulic valve assemblies associated with each of the plurality of hydraulic suspension units, wherein the plurality of hydraulic valve assemblies are in fluid communication between the plurality of hydraulic suspension units and the hydraulic power means; and
   a control means operable to control each of the hydraulic valve assemblies and the associated plurality of hydraulic suspension units to:
      move the vehicle from an operating position to a lowest position;

level the vehicle before moving the vehicle to the lowest position; and move the vehicle to a predefined height, wherein moving the vehicle to the predefined height moves the section of the vehicle corresponding to a locked suspension unit off of the ground.

* * * * *